United States Patent [19]

Froelich et al.

[11] 4,032,401

[45] June 28, 1977

[54] COMBINED SOLID AND LIQUID SYSTEM FOR CONTROLLING NUCLEAR REACTORS

[75] Inventors: Reinhard Froelich, Scottdale; Howard W. Yant, Greensburg, both of Pa.

[73] Assignee: Westinghouse Electric Corporation, Pittsburgh, Pa.

[22] Filed: Aug. 2, 1974

[21] Appl. No.: 494,431

Related U.S. Application Data

[63] Continuation of Ser. No. 267,812, June 30, 1972.

[52] U.S. Cl. .............................. 176/86 R; 176/86 L
[51] Int. Cl.[2] .......................................... G21C 7/22
[58] Field of Search ............ 176/86 R, 86 L, 86 G, 176/86 M, 35

[56] References Cited

UNITED STATES PATENTS

| | | | |
|---|---|---|---|
| 2,735,811 | 2/1956 | Weinberg et al. | 176/86 R |
| 2,830,944 | 4/1958 | Wigner et al. | 176/86 R |
| 2,837,477 | 6/1958 | Fermi et al. | 176/86 R |
| 2,855,354 | 10/1958 | Anderson | 176/86 R |
| 2,917,444 | 12/1959 | Dreffin | 176/86 L |
| 3,103,479 | 9/1963 | Rorsohoff | 176/86 R |
| 3,212,986 | 10/1965 | Pennington | 176/86 R |
| 3,314,859 | 4/1967 | Anthony | 176/35 |
| 3,414,476 | 12/1968 | Paratesi et al. | 176/86 L |
| 3,510,399 | 5/1970 | Terosawa et al. | 176/86 C |
| 3,660,230 | 5/1972 | Bailey Jr. | 176/86 R |

*Primary Examiner*—Harvey E. Behrend
*Attorney, Agent, or Firm*—Edward L. Levine

[57] ABSTRACT

A control system for a nuclear reactor comprising hollow mechanically operated control rods and a liquid neutron absorber which may be circulated through the hollow control rods. The liquid neutron absorber provides the nuclear reactor with a redundant safety system to deactivate the reactor.

8 Claims, 4 Drawing Figures

COMBINED SOLID AND LIQUID SYSTEM FOR CONTROLLING NUCLEAR REACTORS

This is a continuation of application Ser. No. 267,812, filed June 30, 1972.

BACKGROUND OF THE INVENTION

The present invention relates to nuclear reactors and more particularly to a control system for a liquid metal-cooled fast breeder reactor.

A nuclear reactor of the character described is a dual purpose reactor in that it produces nuclear fuel while generating useful energy. The useful energy, which initially is in the form of heat, is produced primarily by fission of plutonium 239 and uranium 238. This fission process produces neutrons in excess of those needed to sustain a nuclear chain reaction. On capture of an excess neutron, a fertile isotope such as uranium 238 is converted to a fissile isotope plutonium 239. The amount of fissile plutonium 239 thus produced actually exceeds the amount of plutonium consumed; hence, the reactor system is entitled "a breeder reactor." Further, since the conversion process is optimal at high neutron speeds, the reactor title is modified to include the word "fast." The fissile plutonium 239, the fertile uranium 238 and some minor amounts of other plutonium and uranium isotopes are combined within fuel rods which in turn are assembled in fuel assemblies. A nuclear core of the reactor is comprised of a plurality of such fuel assemblies arranged in a manner consistent with overall nuclear efficiency.

The heat generated by the fission process within the fuel assemblies is removed by the passage of a reactor coolant through the nuclear core. In a nuclear reactor of the type described herein, the reactor coolant must not slow down the fast neutrons emitted by the fission process because optimal conversion of the fertile uranium isotope requires neutrons having energy levels greater than 0.1 MEV. That is, the reactor coolant must not operate as a moderator as it does in pressurized water reactors; yet, the reactor coolant must possess good heat transfer characteristics so as to efficiently remove the heat from the nuclear core. Sodium, heated to the liquid state, is an example of a reactor coolant satisfying the requirements of a fast breeder reactor.

Typically, a reactor is capable of producing more neutrons than required to sustain criticality at its design power level. This capability is advantageously used during reactor start up and increasing its power to design levels Once the design power level has been reached however, it is necessary to decrease the avilability of neutrons in order to maintain the reactor at steady state operation. The adjustment of the availability of neutrons in a fast breeder nuclear reactor is achieved by insertion or withdrawal of control rods comprised of boron carbide, tantalum or some other suitable neutron absorbing material. These solid materials have high neutron absorbing characteristics which is commonly referred to as large neutron capture cross section. Thus, by varying the position of the control rods, either more or less neutron absorbing material is exposed to the nuclear core and the rate of nuclear fission changes accordingly. Rapid insertion of a number of control rods, generally known as scramming, or rapidly deactivating the reactor, serves to decrease quickly the rate of nuclear fission of the nuclear core and shuts down the reactor.

Heretofore, reactors of the character described have been equipped with a secondary safety system comprising an additional control rod system. The single purpose of this additional control system is to permit reactor shut down should the primary control rods become inoperative. Quite often, the secondary safety system, like the primary safety system, comprises control rods containing solid neutron absorbing materials. With both sets of control rods being similar, it is highly probable that the secondary safety system would become inoperative for the very same reasons that caused failure of the primary control system. The result is that no backup safety system actually exists.

Other backup safety systems, in prior reactors, have attempted to overcome this stuck or inoperative rod problem by utilized a liquid control rod system, that is, a control system comprising a liquid neutron absorber. In the prior art, these control systems were characteristically of two types. The first type injects the neutron absorber liquid directly into the reactor coolant. Although effective, this method suffers from a relatively long response time because of the large volume of neutron absorber fluid required to attain sufficient concentration in the reactor coolant to cause reactor shutdown. Such a method further suffers from the requirement to separate, rapidly and economically, the neutron absorber fluid from the reactor coolant once the backup safety system has been used. Traditionally, cleanup of the reactor coolant has neither been rapid nor economical. The second type of liquid control rod system comprises closed flow paths or tubes placed within the reactor core through which the liquid neutron absorber flows when the safety system is activated. While this technique eliminates the mixture problems inherent in the first type of backup control system, it is extremely disadvantageous in that it occupies core space which would otherwise be used for fuel. Thus, nuclear efficiency of the reactor is decreased and fuel cycle costs are increased.

SUMMARY OF THE INVENTION

In this invention, hollow control rods containing solid neutron absorbing materials are contained within enclosed control rod guides or housings. The solid neutron absorber serves to control a nuclear reactor, such as a liquid metal-cooled fast breeder reactor, during normal and emergency operation. The hollow control rods in conjunction with the enclosed control rod housings provide the control rod assemblies with internal, double pass flow channels transversing the length of the control rods. These flow channels are connected to a flow control system forming a closed flow loop which is completely isolated from the flow of a reactor coolant within the nuclear reactor.

In response to an appropriate shutdown signal, a suitable liquid neutron absorbing material, such as lithium[6], is caused to flow through the closed control system, thereby shutting down the reactor. This provides the nuclear reactor with a backup safety control system which can rapidly shutdown the reactor in the event that the primary control system becomes inoperative by becoming stuck or because of a disruptive accident.

During normal reactor operation, reactor shutdown or other time when the backup safety system has not been activated, a suitable reactor coolant, such as liquid sodium, is caused to flow through the closed control system. In this manner, the backup safety system provides the nuclear reactor with a means to remove heat from the control rods independent of the heat removed from the nuclear core by the flow of the main reactor coolant.

A clean up flow system is included in the closed control system for recovery and cleanup of the liquid neutron absorber after the reactor backup safety system has been used to shut down the reactor.

DESCRIPTION OF THE PREFERRED EMBODIMENTS

Figures 1, 2:
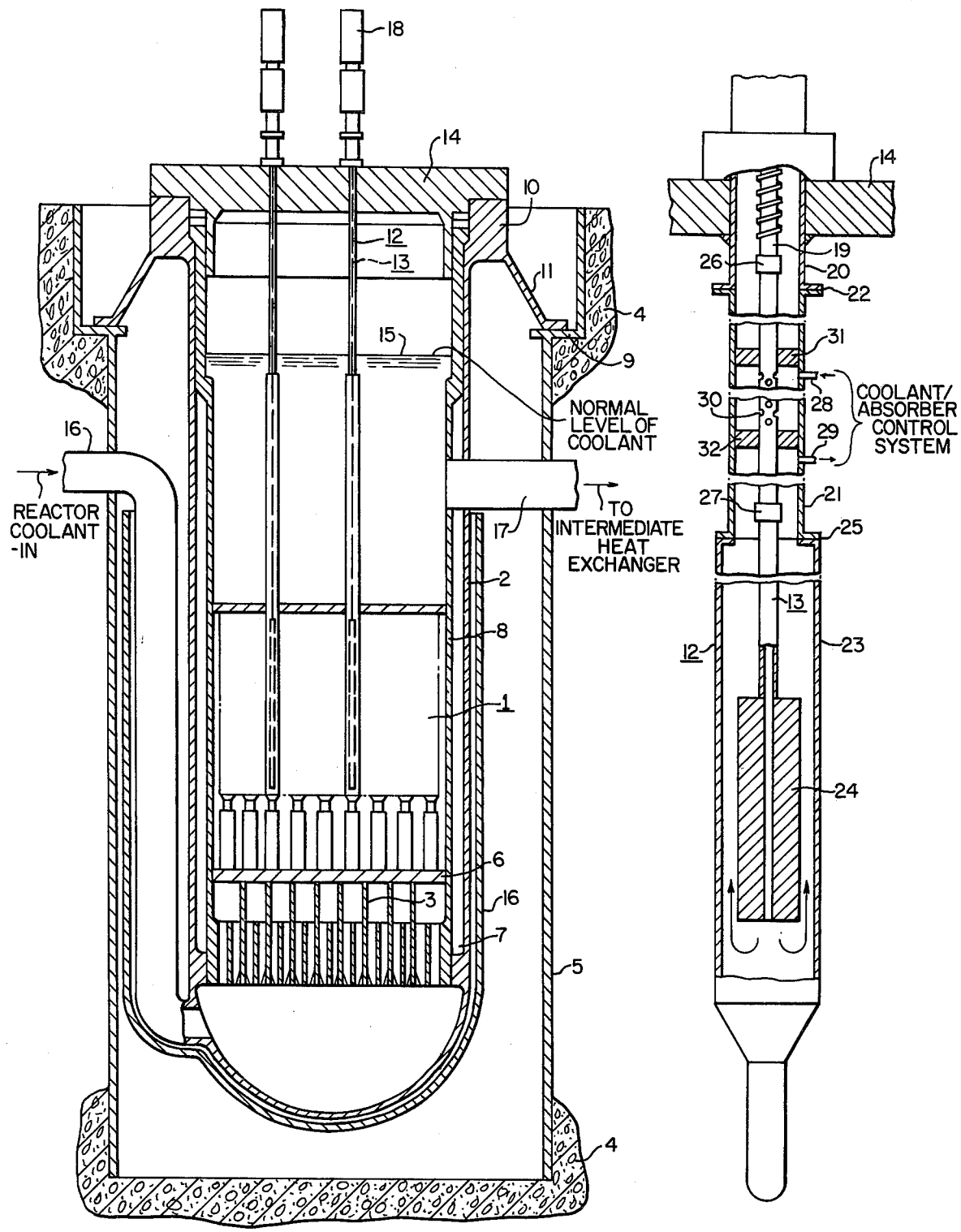
FIG. 1 is a vertical sectional view of one form of a nuclear reactor to which this invention may be applied.
FIG. 2 is an enlarged foreshortened sectional view of a combined solid and liquid control system.

Throughout the description which follows like reference characters indicate like elements in the various figures of the drawings.

Referring now more particularly to FIG. 1 of the drawings, the nuclear reactor depicted therein is in accordance with a "pipe system" arrangement for a liquid metal-cooled fast breeder reactor. In this type of arrangement, a nuclear core 1 is contained within a relatively small reactor pressure vessel 2, from which reactor coolant, after flowing through the nuclear core 1, flows through a piping system 17 to intermediate heat exchangers (not shown). The intermediate heat exchangers are located in concrete vaults (not shown) external to a steel lined concrete pit or more simply a reactor vessel vault 4. The steel lining 5 acts as primary shielding for the nuclear core 1. It is to be noted that although a pipe system arrangement for a liquid metal-cooled fast breeder reactor is shown, the invention to be described later can equally be applied to a "pot system" arrangement for such a reactor. In the latter arrangement, a nuclear core and intermediate heat exchangers are all located in one large reactor pressure vessel which in turn is located in one large vault.

Further, although the drawings are based on a liquid metal-cooled fast breeder reactor, the invention can equally be applied to any other type of nuclear reactor system which is used to produce commercial energy notwithstanding the ability of the reactor to produce nuclear fuel (i.e., breed).

Referring again to FIG. 1, the nuclear core 1 is axially supported by a lower core plate 6 which in turn is supported by columns 3 attached to a lower support structure 7. The load from the lower support structure 7 is transferred to a core barrel 8 and ultimately to a support ledge 9 in the reactor vessel vault 4 by the reactor pressure vessel flange 10 and a conical support member 11.

A plurality of generally cylindrical enclosures 12, which house control rod assemblies 13, penetrate a reactor pressure vessel closure head 14 and extend into the nuclear core 1. A steel guard tank 16 surrounds the reactor pressure vessel 2 from a location just below the reactor coolant inlet 16 and outlet 17 piping and extends to and around the bottom of the reactor pressure vessel 2. A reactor pressure vessel 2 thus encapsulated assures submergence of the nuclear core 1 in the unlikely event of a reactor pressure vessel 2 rupture or, some other similar accident.

The upper end of the reactor pressure vessel 2 is hermetically sealed by the removable closure head 14 upon which are mounted a plurality of control rod drive mechanisms 18. For simplicity, FIG. 1 shows only two such mechanisms 18 and two control rod enclosures 12. The drive mechanisms 18 are connected to individual control rod drive shafts which pass through sleeved penetrations 20 conventionally attached, such as by welding, to the pressure vessel enclosure head 14, as shown in FIG. 2. The lower end of the sleeve 20 is connected, for example by bolting, to either an intermediate sleeve 21 or directly to an enclosure 23 housing a control rod 24 of the control rod assembly 13. Leakproof joints 22 and 25, in conjunction with appropriate control rod shaft joints 26 and 27, permit removal of this hardware to the degree necessary to carry on refueling operations while the control rod 24 remains fully inserted in the nuclear core 1.

At appropriate locations, inlet 28 and outlet 29 flow lines are connected to the control rod enclosure 12 so that a reactor coolant, such as liquid sodium, or a liquid neutron absorber, for example lithium$^6$, may enter and exit the control rod enclosures 12 independent of the flow of the main reactor coolant 15 through the nuclear core 1. In this manner, the neutron absorber fluid may enter the control rod enclosure 12 through the inlet pipe 28, enter a hollow control rod drive shaft 19 through holes 30 provided in the drive shaft 19, flow down through the length of the hollow drive shaft 19 and through the control rod 24. Upon exiting from the bottom of the control rod assembly 13, the neutron absorber fluid reverses direction and flows up through the control rod enclosure 12 on the outside of the control rod assembly 13 and then exits the control rod enclosure 12 through the outlet pipe 29. As shown in FIG. 2, appropriate seals 31 and 32 are provided between the outside of the control rod shaft 19 and the inside of the control rod enclosure 12 so that the neutron absorber fluid entering the control rod enclosure 12 is kept separate from the fluid exiting the control rod enclosure 12. In the manner described above, the neutron absorber fluid may be introduced into the nuclear core 1 by the path provided by the control rod assembly 13 and the control rod enclosure 12 at the same core locations which are occupied by control rod assemblies 13. Thus, a backup control system, using a liquid neutron absorber, is provided in combination with a control rod system using solid neutron absorbing materials at single core locations. This represents very economical utilization of reactor core locations for control purposes in that fuel space is not sacrificed for the backup control system. This further represents a liquid backup control system which is not required to be mixed with a reactor coolant in order to save fuel space.

Up to this point, the discussion concerning the fluid flow within the portion of the enclosed system comprising the control rod assembly 13 in the control rod enclosure 12 has been limited to a liquid neutron absorber, such as lithium$^6$. However, in accordance with this invention, either a liquid neutron absorber or a reactor coolant may selectively be flowed through the combined control rod system. During normal reactor operation, it is advantageous to flow a reactor coolant, such as liquid sodium through the combined control rod system. The reactor coolant serves the purpose of maintaining the temperature of the control rods 24 at reasonable levels by removing the heat generated within the control rods 24 by the nuclear fission process. This heat removal feature of the closed flow loop comprising the combined control rod flow system provides an economical advantage at reactor shutdown for the removal of decay heat generated within the control rods 24. The percentage of heat generated in a fuel assembly compared to the percentage of heat generated in a control rod is characteristically less at reactor shutdown than during normal reactor operation. Therefore, post shutdown cooling problems are encountered if both fuel assemblies and control rods are cooled by the same cooling system. In prior art, to assure sufficient cooling of the control rods, after reactor shutdown, the fuel assemblies are overcooled. This cooling problem is overcome by the combined solid and liquid control system. The use of separate coolant flow systems for the fuel assemblies and the control rods allows for independent cooling of each of the component assemblies.

Figure 3:
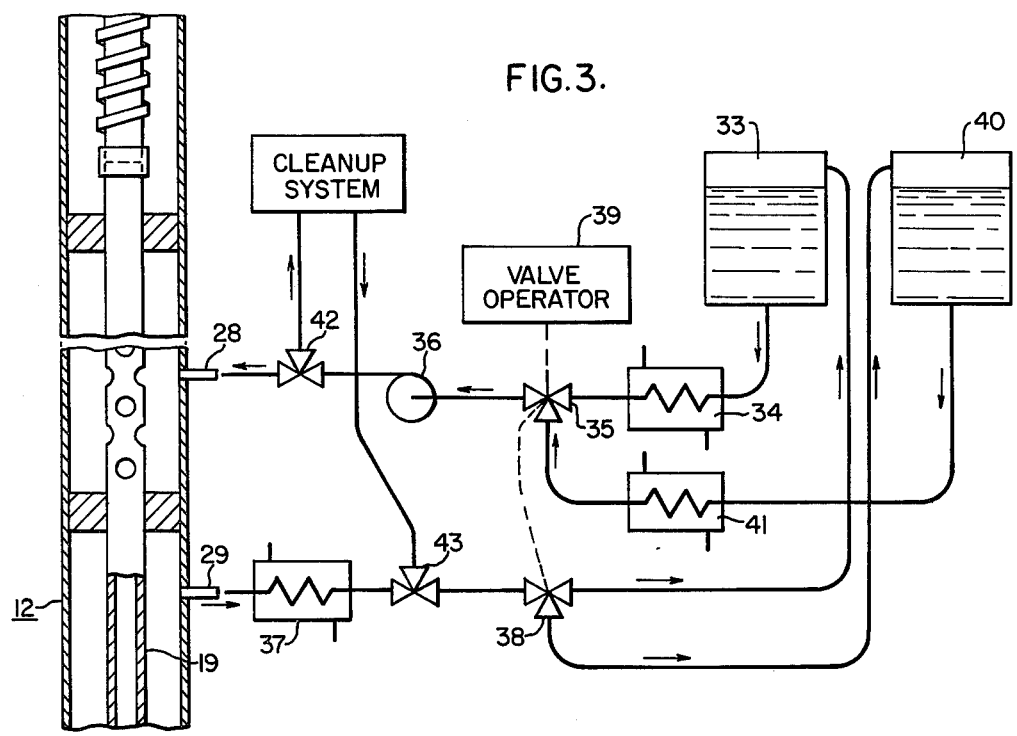
FIG. 3 is a schematic flow diagram of one version of a coolant/absorber control system as provided by this invention; and, FIG. 4 is a schematic flow diagram of another version of a coolant/absorber control system provided by this invention.

The coolant/absorber control system schematically shown in FIG. 3 employs a mechanical means, such as a pump, to force the flow of either the reactor coolant or the liquid neutron absorber through the combined control rod system. During normal reactor operation, the reactor coolant, in this case sodium, flows from a reactor coolant storage tank 33 through an inlet heat exchanger 34, an inlet flow selector valve 35, and a circulating pump 36. The reactor coolant enters the control rod enclosure 12 through the inlet pipe 28, is then forced through the combined solid and liquid control rod system as described above and returns to the coolant/absorber control system through an outlet heat exchanger 37 and an outlet flow selector valve 38 which returns the coolant to the storage tank 33.

For normal reactor shutdown, the control rod 24 is fully inserted in the nuclear core 1. If because of a stuck rod or a disruptive accident, the control rod assembly 13 cannot be moved, the liquid neutron absorber shutdown system is utilized. The selector valve operator 39 switches the inlet and the outlet valves 5 and 38 respectively, to isolate the reactor coolant circulating system and activate the liquid neutron absorber circulating system. The absorber fluid, in this case lithium$^6$, is circulated from a liquid neutron absorber storage tank 40, through an inlet heat exchanger 41, the inlet flow selector valve 35, and the circulating pump 36. The liquid neutron absorber enters the control rod enclosure 12 through the inlet pipe 28, is then forced through the combined solid and liquid control rod system as described above thereby shutting down the reactor. The absorber fluid return path to the storage reservoir 40 is through the outlet heat exchanger 37, and the selector valve 38. The absorber fluid is continually circulated after reactor shutdown to remove decay heat generated in the combined control rod system. The liquid neutron absorber fluid is stored in sufficient quantity to dilute the residual reactor coolant in the coolant/absorber control system when the reactor shutdown is initiated. The coolant/absorber system is reset for future use by opening the cleanup system isolation valves 42 and 43, flushing with reactor coolant and separating the mixture of reactor coolant and neutron absorber fluid into its constituent parts. The storage tanks 37 and 40 are then recharged with their respective fluids.

Figure 4:
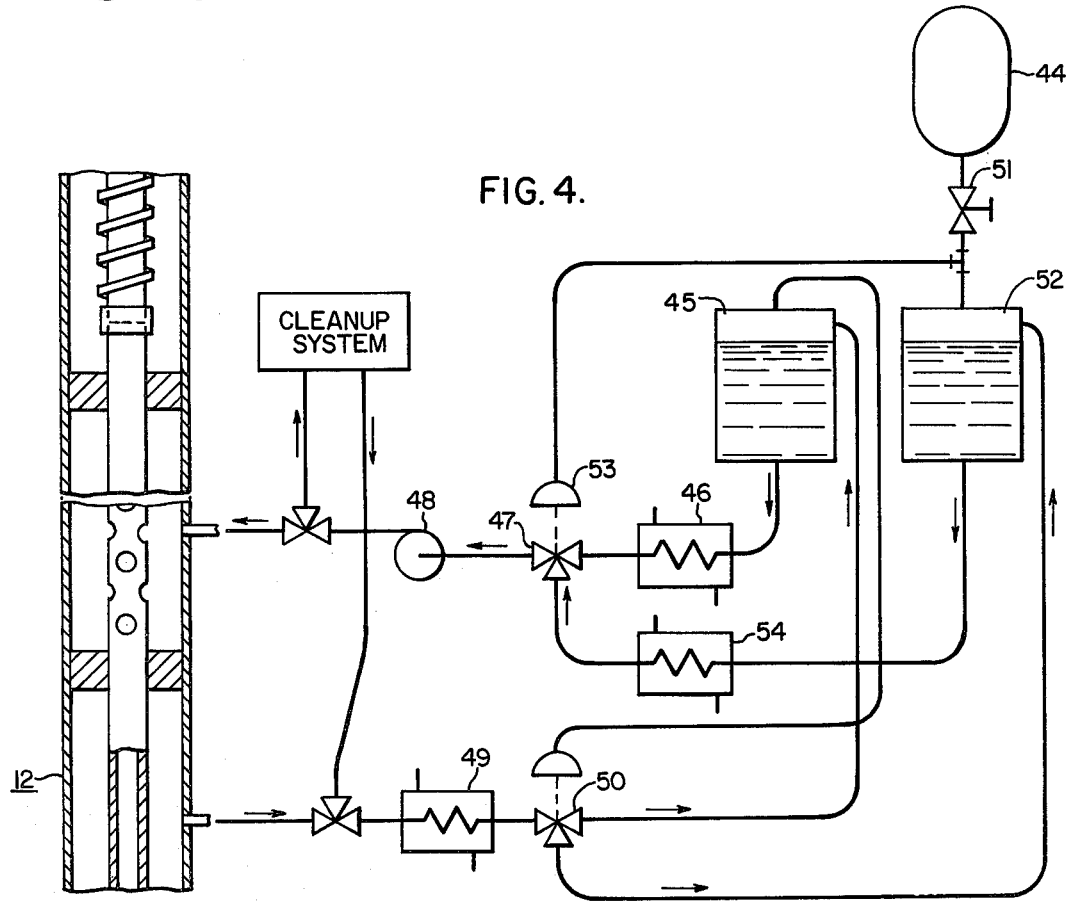

A variation of the coolant/absorber control system of the combined solid and liquid control rod system is shown in FIG. 4. This control system uses gas pressure from a gas receiver 44 to achieve a very rapid response to a shutdown signal by increasing the rate of insertion of the liquid neutron absorber beyond the usual flow rate of the circulating pump. During normal reactor operation, the reactor coolant flows from a reactor coolant storage tank 45, through an inlet heat exchanger 46, an inlet selector valve 47, and a circulating pump 48. The reactor coolant then enters and flows through the combined solid and liquid control rod system as explained above, and returns to the coolant/absorber control system through an outlet heat exchanger 49, and an outlet selector valve 50, which returns the reactor coolant to the storage tank 45.

To initiate a reactor shutdown by the liquid neutron absorber control system, a gas receiver shutoff valve 51 is opened thereby pressurizing a liquid neutron absorber storage tank 52 and an inlet selector valve actuator 53. The gas pressure then forces the absorber fluid through an inlet heat exchanger 54, the inlet selector valve 47, the circulating pump 48, and through the combined control rod system thereby shutting down the reactor. The outlet selector valve 50 is equipped with a delay mechanism allowing the initial reactor coolant forced from the combined control rod system 13 and 14, to be returned to the reactor coolant storage tank 45. When the storage tank 45 is filled, the return flow is diverted to the liquid neutron absorber storage tank 52, minimizing dilution of the liquid absorber.

The coolant/absorber control system shown in FIG. 4 is reset for future use by flushing with reactor coolant and utilizing a cleanup system as explained in the previous control system.

From the foregoing description, taken in connection with the drawings, it is seen that this invention provides a nuclear reactor control system comprising a combined solid and liquid neutron absorbing control rod system and a coolant/absorber flow control system, which will continue to be functional in the event of a disruptive accident or some other condition, which would cause a reactor control system to become inoperative, and which is capable of rapidly responding to a reactor shutdown signal, and which does not sacrifice valuable fuel space within a nuclear core while performing these functions.

Since numerous changes may be made in the above described apparatus, different embodiments of the invention may be without departing from the spirit and scope thereof, it is intended that all matter contained in the foregoing description or shown in the accompanying drawings shall be interpreted as illustrative and not in a limiting sense.

I claim as my invention:

1. A control and shutdown system for a nuclear reactor, said nuclear reactor comprising a vessel, a vessel closure head, a nuclear core in said vessel, a coolant liquid circulating system for circulating a first cooling liquid into and out of said vessel for cooling said nuclear core, said control system comprising:
   a. control rod drive mechanism affixed to said head,
   b. an elongated hollow control rod enclosure stationary during reactor operation extending vertically downward from said mechanism through said head and said core and being closed at its bottom,
   c. a control rod shaft cooperatively associated with said mechanism for selected vertical positioning within said enclosure, said shaft having a hollow portion and openings in said shaft for receiving a fluid into said hollow portion, d. a control rod comprised of a solid neutron absorbing material removably coupled to the bottom of said shaft and having a fluid passageway therethrough in fluid communication with said hollow portion and extending to the bottom of said rod, e. first sealing means between said enclosure and said shaft positioned above said openings, f. second sealing means between said enclosure and said shaft positioned below said openings, g. means affixed to said enclosure for inletting a liquid into the region within said enclosure between said first and second sealing means, h. means affixed to said enclosure for outletting a liquid from the region within said enclosure below said second sealing means, and i. means connecting said inletting and outletting means for selectively circulating a neutron absorber liquid and a second reactor coolant liquid through said shaft, said rod, and said enclosure, said connecting means forming a closed flow loop isolated from the flow of said first cooling liquid, said neutron absorber liquid serving to shut down said nuclear reactor, and said second reactor coolant serving to remove heat generated within said control rods.

2. The control rod system of claim 1 wherein said neutron absorbing solid is tantalum, said neutron absorbing liquid is lithium$^6$ and said first and second reactor coolant liquids are sodium.

3. The system of claim 1 wherein said circulating means comprises a fluid storage reservoir for storing said neutron absorbing fluid, a circulating pump connected to said fluid storage reservoir for circulating said neutron absorbing fluid through said control rod system, means for connecting said circulating pump to said inletting means, and means for connecting said outletting means to said fluid storage reservoir for returning the flow of said neutron absorbing fluid from said enclosure to said fluid storage reservoir.

4. The system of claim 1 wherein said circulating means comprises a fluid storage reservoir for storing said second reactor coolant, a circulating pump connected to said fluid storage reservoir for circulating said second reactor coolant through said shaft, rod and enclosure, means for connecting said circulating pump to said inletting means, and means for connecting said outletting means to said fluid storage reservoir for returning the flow of said reactor coolant from said enclosure to said fluid storage reservoir.

5. The system of claim 3 including a gas receiver for storage of a gas under pressure, said gas receiver being connected to said fluid storage reservoir for circulating the said neutron absorbing fluid through the said shaft, rod, and enclosure at a flow rate beyond the usual flow rate of said circulating pump.

6. The control and shutdown system of claim 1 wherein said inletting means comprises an inlet pipe and said outletting means comprises an outlet pipe.

7. The control and shutdown system of claim 1 wherein said control rod is comprised of boron carbide.

8. The control and shutdown system of claim 1 wherein said enclosure is comprised of a plurality of sections removably joined by leakproof joints thereby permitting removal of at least one of said sections so as to carry on refuelling operations while said rod, being uncoupled from said shaft, remains inserted within said core.

* * * * *